(12) United States Patent
Dong et al.

(10) Patent No.: US 11,514,567 B2
(45) Date of Patent: Nov. 29, 2022

(54) ON-LINE REAL-TIME DIAGNOSIS SYSTEM AND METHOD FOR WIND TURBINE BLADE (WTB) DAMAGE

(71) Applicant: Inner Mongolia University of Technology, Hohhot (CN)

(72) Inventors: Chaoyi Dong, Hohhot (CN); Xiaoyi Zhao, Hohhot (CN); Xiaoyan Chen, Hohhot (CN)

(73) Assignee: Inner Mongolia University of Technology, Hohhot, NM (US)

( * ) Notice: Subject to any disclaimer, the term of this patent is extended or adjusted under 35 U.S.C. 154(b) by 312 days.

(21) Appl. No.: 16/903,037

(22) Filed: Jun. 16, 2020

(65) Prior Publication Data

US 2020/0402220 A1 Dec. 24, 2020

(30) Foreign Application Priority Data

Jun. 24, 2019 (CN) .......................... 201910551222.5

(51) Int. Cl.
| | |
|---|---|
| *G06T 7/00* | (2017.01) |
| *G01S 13/933* | (2020.01) |
| *B64C 39/02* | (2006.01) |
| *B64D 47/08* | (2006.01) |
| *G01S 13/08* | (2006.01) |

(Continued)

(52) U.S. Cl.
CPC ............ *G06T 7/001* (2013.01); *B64C 39/024* (2013.01); *B64D 47/08* (2013.01); *G01S 13/08* (2013.01); *G01S 13/933* (2020.01); *G06K 9/6217* (2013.01); *G06K 9/6268* (2013.01); *G06V 20/10* (2022.01); *H04N 5/2253* (2013.01); *B64C 2201/027* (2013.01); *B64C 2201/108* (2013.01);

(Continued)

(58) Field of Classification Search
None
See application file for complete search history.

(56) References Cited

U.S. PATENT DOCUMENTS

| | | | |
|---|---|---|---|
| 2020/0018291 A1* | 1/2020 | Rosen | .............. F03D 17/00 |
| 2020/0279367 A1* | 9/2020 | White | .............. B64C 39/024 |
| 2020/0302181 A1* | 9/2020 | Bhanu | .............. G06V 20/42 |

FOREIGN PATENT DOCUMENTS

| | | | |
|---|---|---|---|
| AU | 2019100354 A4 * | 5/2019 | .............. G06K 9/00 |
| CN | 104215640 A | 12/2014 | |

(Continued)

*Primary Examiner* — Heather R Jones
(74) *Attorney, Agent, or Firm* — Dorsey & Whitney LLP (57) ABSTRACT

The present invention provides an on-line real-time diagnosis system and method for wind turbine blade (WTB) damage. The system includes a four-rotor unmanned aerial vehicle (UAV), a cloud database, and a computer system. The four-rotor UAV captures images of WTBs in real time, and transmits the images to the computer system. The cloud database stores an image library used for a Visual Geometry Group (VGG)-19 net image classification method, where an image in the image library stored in the cloud database is dynamically captured from a network. The computer system is used to perform training by using the image library to obtain an improved VGG-19 net image classification method, and classify, by using the improved VGG-19 net image classification method, the images of the WTBs received from the four-rotor UAV, to obtain a WTB damage diagnosis and classification result and a damage grading result.

11 Claims, 11 Drawing Sheets

(51) Int. Cl.
*G06K 9/62* (2022.01)
*H04N 5/225* (2006.01)
*G06V 20/10* (2022.01)

(52) U.S. Cl.
CPC .................. *B64C 2201/127* (2013.01); *G06T 2207/20081* (2013.01); *G06T 2207/30164* (2013.01)

(56) References Cited

FOREIGN PATENT DOCUMENTS

| | | |
|---|---|---|
| CN | 107144569 A | 9/2017 |
| CN | 109741320 A | 5/2019 |

\* cited by examiner

ON-LINE REAL-TIME DIAGNOSIS SYSTEM AND METHOD FOR WIND TURBINE BLADE (WTB) DAMAGE

TECHNICAL FIELD

The present invention relates to the field of wind turbine blade (WTB) damage diagnosis, and particularly to an on-line real-time diagnosis system and method for WTB damage.

BACKGROUND

There are multiple solutions of diagnosing a WTB fault in the prior art, but the existing solutions have particular defects. The patent application CN107144569A proposes a WTB fault diagnosis method based on selective search and segmentation and a support vector machine (SVM) classification algorithm with a deep convolutional neural network being a feature extractor. First, selective search and segmentation are performed on a to-be-detected image, to obtain a region candidate. Then, a deep convolutional neural network is trained by using an ImageNet image set, and a network structure other than an output layer is extracted as the feature extractor. Finally, an SVM classifier is trained by using an extracted feature of a WTB image, to complete a fault diagnosis task. The foregoing method has the following defect: For a fault diagnosis algorithm for a WTB image, the Imagenet image set is used as training data, to determine a deep convolutional network structure parameter. The network structure parameter curing method cannot indicate that the network structure performance is optimal. The patent application CN104215640A proposes a WTB defect and damage checking method based on an unmanned helicopter and a checking system. An optical, thermal, and acoustic signal collection device is disposed on a small unmanned helicopter. The unmanned helicopter is operated to near blades on a wind turbine on a wind power plant, to collect optical, thermal, and acoustic signals of the blades, and record the signals or transmit the signals back, so that the ground crew analyzes states of the blades, to complete a wind turbine fault detection task. The foregoing method has the following defects: In the method, the unmanned helicopter is provided with the optical, thermal, and acoustic signal collection devices, to collect data of the WTBs. Executing a data collection task in a strong wind environment by the unmanned helicopter may not be very stable. In addition, the unmanned helicopter has a complex structure, has high vibration and noise during running, and has a large maintenance work amount, high use costs, and a poor endurance ability. As a result, the unmanned helicopter is not quite appropriate for the task. The patent application CN109741320A proposes a WTB fault detection method based on an aerial photo. A WTB image is collected by using an unmanned aerial vehicle (UAV). A three-dimensional visual model of a WTB is constructed based on an enhanced image. A reconstructed image is subtracted from an original image including a defect by using a difference method to obtain residual information of a main component, and inverse transformation is performed on the residual information. An image of a blade having a defect is classified into a spalling category, a crack category, a sand inclusion category, or the like by using Alexnet. In addition, defects are classified into different defect levels based on a defect and damage degree by using a deep network hierarchical model. The foregoing method has the following defects: In the WTB fault detection method, damages of the WTBs are classified based on images by using the Alexnet, and the Alexnet classification method has a simple structure. In addition, only three defect categories of the blade: spalling, crack, and sand inclusion, are detected in the method, and a damage grading result is not highly precise.

SUMMARY

In one aspect of the present invention, an on-line real-time diagnosis system for a wind turbine blade (WTB) damage is proposed. The system includes a four-rotor UAV, a cloud database, and a computer system. The four-rotor UAV captures images of WTBs in real time, and transmits the images to the computer system. The cloud database stores an image library used for a Visual Geometry Group (VGG)-19 net image classification method, where an image in the image library stored in the cloud database is dynamically captured from a network. The computer system is used to perform training by using the image library to obtain an improved VGG-19 net image classification method, and classify, by using the improved VGG-19 net image classification method, the images of the WTBs received from the four-rotor UAV, to obtain a WTB damage diagnosis result and a damage grading result.

In one aspect of the present invention, the four-rotor UAV includes: one or more distance sensors disposed on a vehicle body and used to avoid surrounding obstacles; a radio signal transmitter used to communicate with the computer system, and a pan-and-tilt head (PTH) used to capture an image.

In one aspect of the present invention, the four-rotor UAV collects the images of the WTBs by using different cruise paths based on operating conditions of a wind turbine.

In one aspect of the present invention, when the wind turbine is shut down for maintenance in a least windy period, the UAV is away from the WTBs by a first distance, and a preventive maintenance inspection route of the UAV from a preventive maintenance inspection start point to a preventive maintenance inspection end point is circling the three WTBs once; when the WTB normally rotates slowly, the UAV is away from the WTBs by a first distance, and the UAV starts from an intersection point of the three WTBs, cruises in a lengthwise direction of a first blade, then cruises to a centrifugal end of a second blade and then in a lengthwise direction of the second blade from the centrifugal end of the second blade to the intersection point, and finally cruises in a lengthwise direction of a third blade from the intersection point, to reach a centrifugal end of the third blade; and when the WTB rotates fast in a most windy period, the UAV is away from the WTBs by a second distance, and the UAV reciprocates only between two sampling points on a WTB in a lengthwise direction, where the second distance is greater than the first distance, and a quantity of sampling points is set based on a distance between the UAV and the WTBs, to ensure that complete images of the WTBs can be collected.

In one aspect of the present invention, the cloud database obtains images of surfaces of the WTBs on a specified website or a whole network by using a Python crawler, and stores the images.

In one aspect of the present invention, the computer system uploads the images of the WTBs regularly captured by the four-rotor UAV to the specified website, so that the Python crawler obtains the images and updates the cloud database.

In one aspect of the present invention, in the improved VGG-19 net image classification method, an original rectified linear unit (ReLU) function sublayer of a VGG-19 net is replaced with a leaky rectified linear unit (LeakyReLU)

function sublayer to implement algorithm improvement, and a structure of a classification layer is reconstructed.

In one aspect of the present invention, at the reconstructed classification layer, damage diagnosis categories include a background category, a zero damage category, a pseudo-damage category, a sand inclusion category, a crack category, a pitted surface category, a coating falling off category, a coating repair category, an edge corrosion category, a mixed damage category, and a surface water seepage category, and damage grades include a minor damage, an intermediate damage, and a severe damage.

In one aspect of the present invention, an on-line real-time diagnosis method for a WTB damage is further provided. The method includes: collecting, by a four-rotor UAV, images of WTBs, and transmitting the collected images to a computer system; training, by the computer system, a VGG-19 net model in an improved VGG-19 net image classification method by using a dynamically updated training and testing image library provided by a cloud database; receiving, by the computer system, the collected images, and classifying the images by using the VGG-19 net image classification method; and outputting, by the computer system, a blade damage state based on an image classification result.

In this solution, the four-rotor UAV is used. The four-rotor UAV has the following features: a strong anti-wind capability, low energy consumption, high efficiency, taking off and landing basically vertically, being uneasily affected by an environment factor, and the like. Compared with an unmanned helicopter, the four-rotor UAV is more suitable for collecting data of WTBs. This solution further proposes a classification method in which data of WTBs is collected, stored, and transmitted to a ground analysis station, and the ground analysis station diagnoses a damage category thereof. The classification method is improved based on a deep convolutional network VGG-19 net. The VGG-19 net is a classification algorithm having better performance, and wins the championship of the 2014 Imagenet large scale visual recognition challenge (ILSVRC). A network structure parameter of the algorithm is cured based on a particular theory. In the improved method, only one parameter is added based on the original method. An optimal structure of the improved classification algorithm can be determined by successively modifying the parameter in an experiment, and damage grading is performed thereon, to set up a human-computer interaction interface, to implement one-button diagnosis on damages of surfaces of the WTBs. As can be learned, the present invention includes the following innovation points: A function module that needs to be carried in a UAV used to collect images of WTBs is designed. Multiple cruise paths of the UAV are planned based on operating conditions of the WTBs, and multiple image collection solutions are designed. Multiple common damages of the WTBs are automatically diagnosed by using the improved VGG-19 net. Latest images of the WTBs on a web page are obtained by using the Python crawler, and are added to a training set, to train an improved VGG-19 net classifier, to improve a generalization capability of the classifier. The human-computer interaction interface is set up, to form a complete on-line diagnosis system for WTB damage.

DETAILED DESCRIPTION

Figure 1:
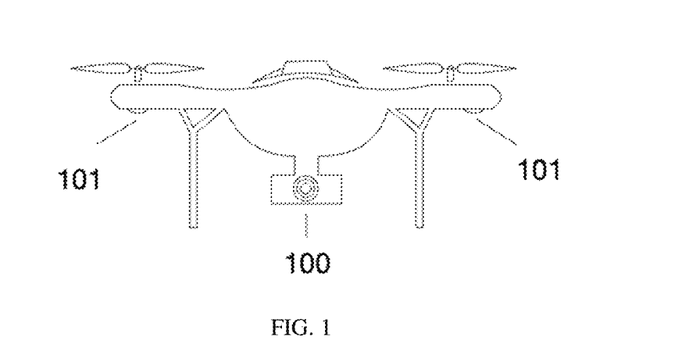
FIG. 1 is a side view of a four-rotor UAV.
Figure 2:
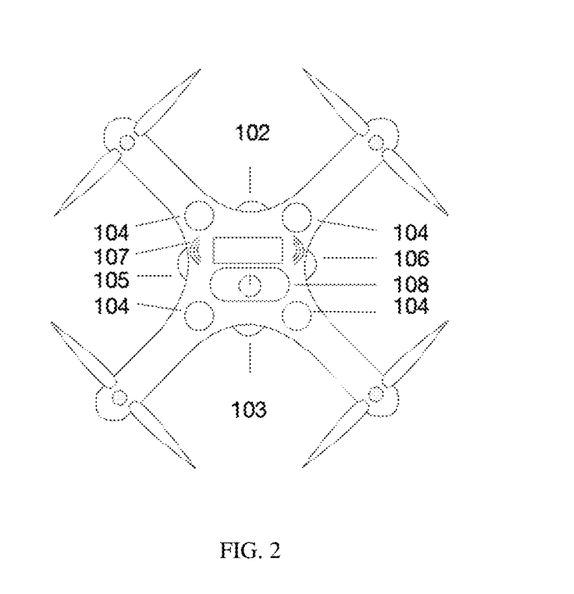
FIG. 2 is a top view of a four-rotor UAV.

FIG. 1 and FIG. 2 are schematic diagrams of a four-rotor UAV used in the present invention.

As shown in FIG. 1 and FIG. 2, the four-rotor UAV includes one or more downward distance sensors 101, one or more upward distance sensors 104, one or more leftward distance sensors 105, one or more rightward distance sensors 106, one or more forward distance sensors 102, one or more backward distance sensors 103, a radio signal transmitter 107, a switch 108, and a pan-and-tilt head (PTH) 100 that are disposed on a vehicle body. Four downward distance sensors are disposed at the bottom of the UAV, are used to avoid obstacles below the UAV, and are used for landing buffer. Four upward distance sensors are disposed at the top of the four-rotor UAV, and are used to avoid obstacles above the UAV when the PTH tilts downward for preventive maintenance inspection and photographing. One distance sensor is disposed on each of the front, the back, the left, and the right of the UAV, and the distance sensors are respectively the forward distance sensor, the backward distance sensor, the leftward distance sensor, and the rightward distance sensor, and all are used to avoid obstacles. The radio signal transmitter is used to transmit back a preventive maintenance inspection result of the PTH in real time, and transmit collected images back to a ground diagnosis system.

FIG. 3 to FIG. 8 are schematic diagrams of distances between the UAV and a wind turbine, sampling points, and cruise paths when the WTB rotates at different speeds. In the present invention, the four-rotor UAV samples images of the WTBs in different operating conditions, to comprehensively and accurately capture images of damages on surfaces of the WTBs in a manner of UAV cruising, and transmit the images to a ground work area in real time.

Figure 3:
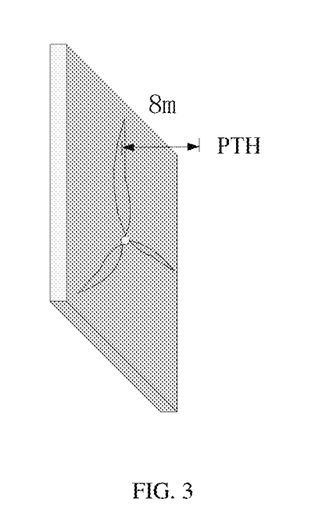
FIG. 3 is a schematic diagram of a first distance between a UAV and WTBs.
Figure 4:
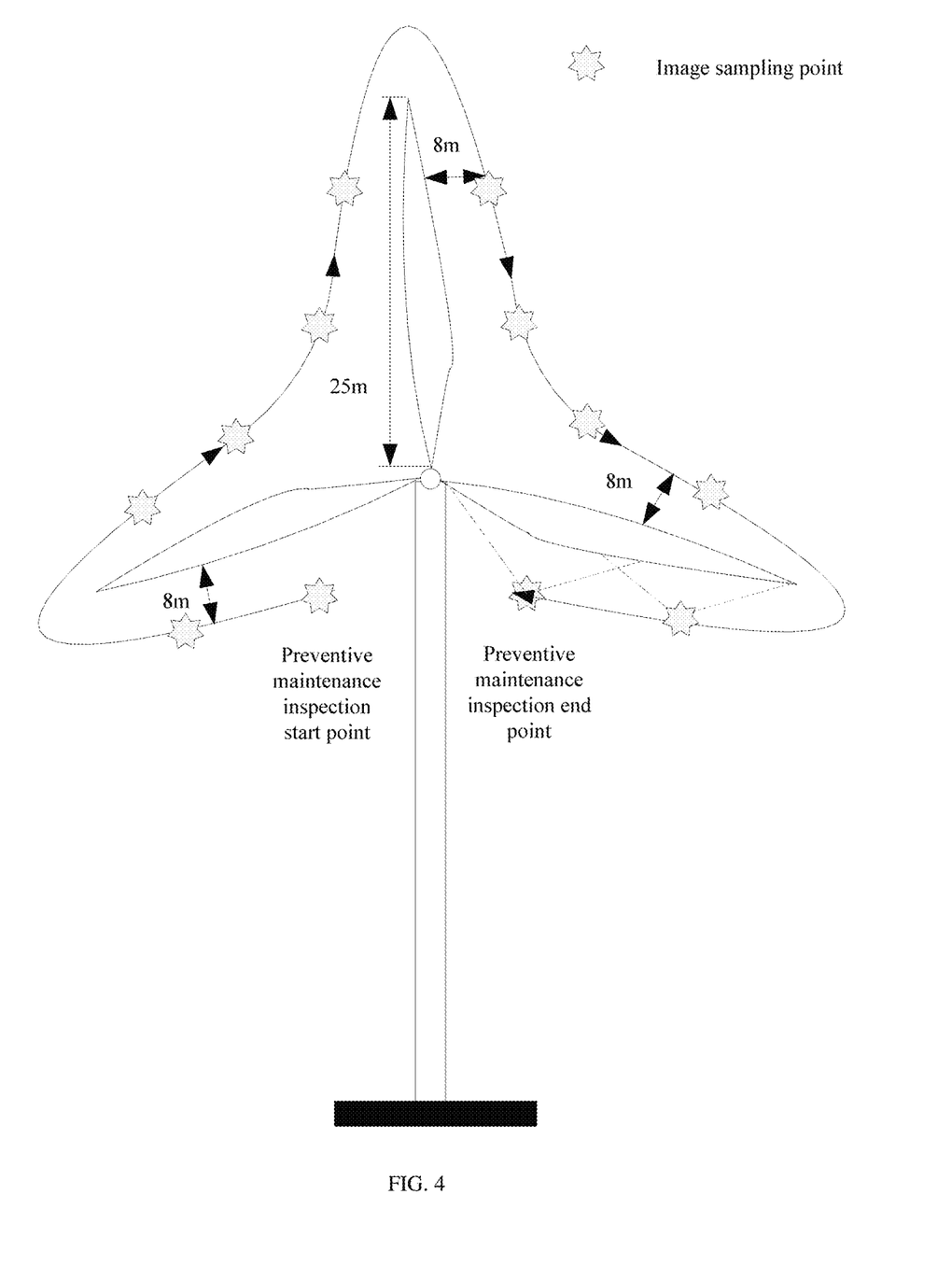
FIG. 4 is a schematic cruise diagram of a UAV when a wind turbine is shut down for maintenance.

FIG. 3 and FIG. 4 show a cruising path and an image collection method of the UAV when the wind turbine is shut down for maintenance in a least windy period.

As shown in FIG. 3 and FIG. 4, when the wind turbine is shut down for maintenance in the least windy period, in an example, the UAV is eight meters away from the WTBs.

Because the UAV can collect at least images of WTBs with a length of 15 meters and a width of 10 meters, when a length of a WTB is 25 meters and a width of the WTB generally does not exceed 5 meters, two image sampling points are disposed on each WTB, to ensure that an image of an entire wing surface of the blade is captured.

An example of FIG. 4 shows a preventive maintenance inspection route of the UAV when the UAV circles around the wind turbine for photographing when the wind turbine is shut down for maintenance in the least windy period. As shown in FIG. 4, the preventive maintenance inspection route of the UAV from a preventive maintenance inspection start point to a preventive maintenance inspection end point is circling around the three WTBs once, and one side of each WTB is provided with two image sampling points.

Figure 5:
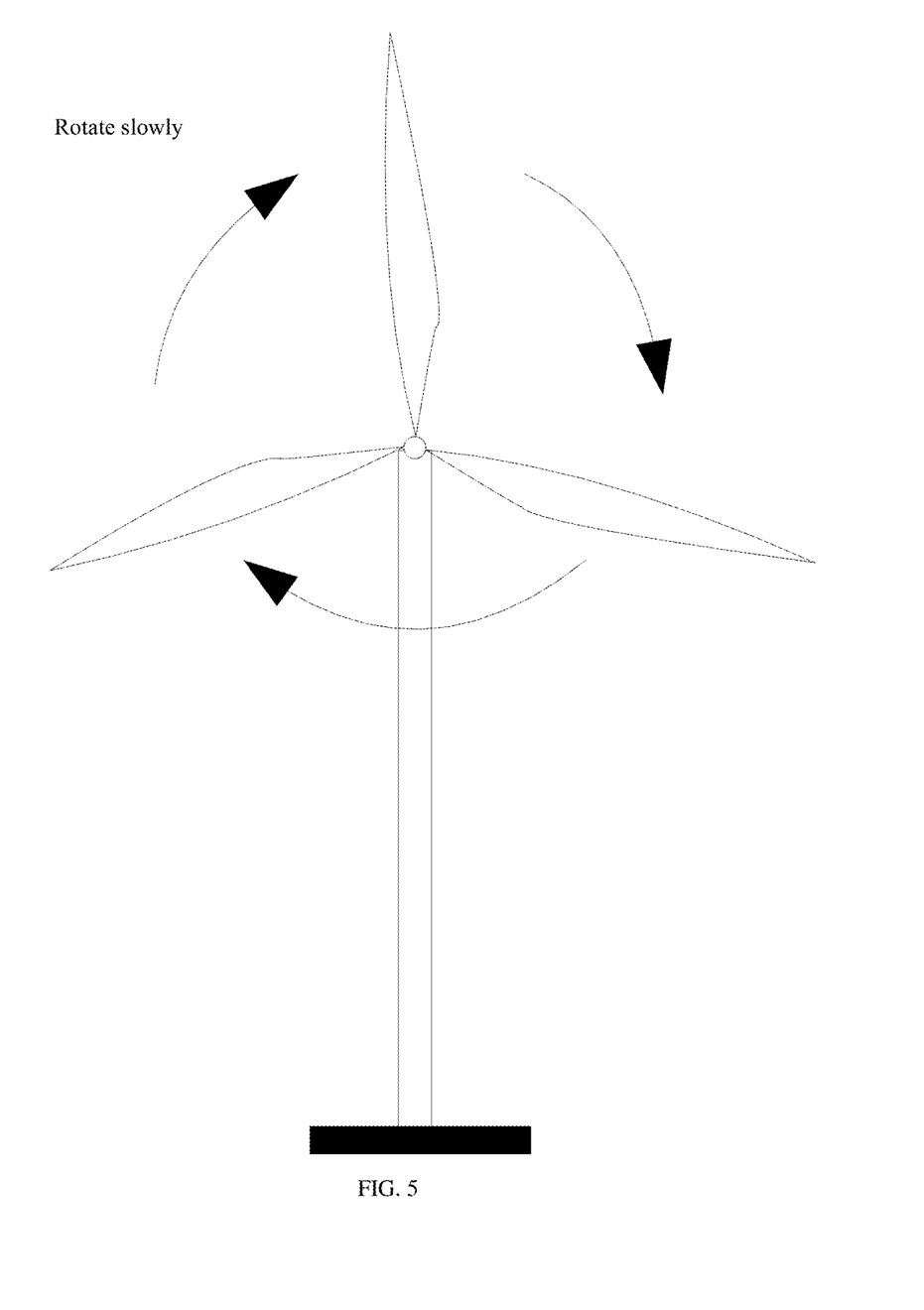
FIG. 5 is a schematic diagram showing that a WTB rotates slowly.
Figure 6:
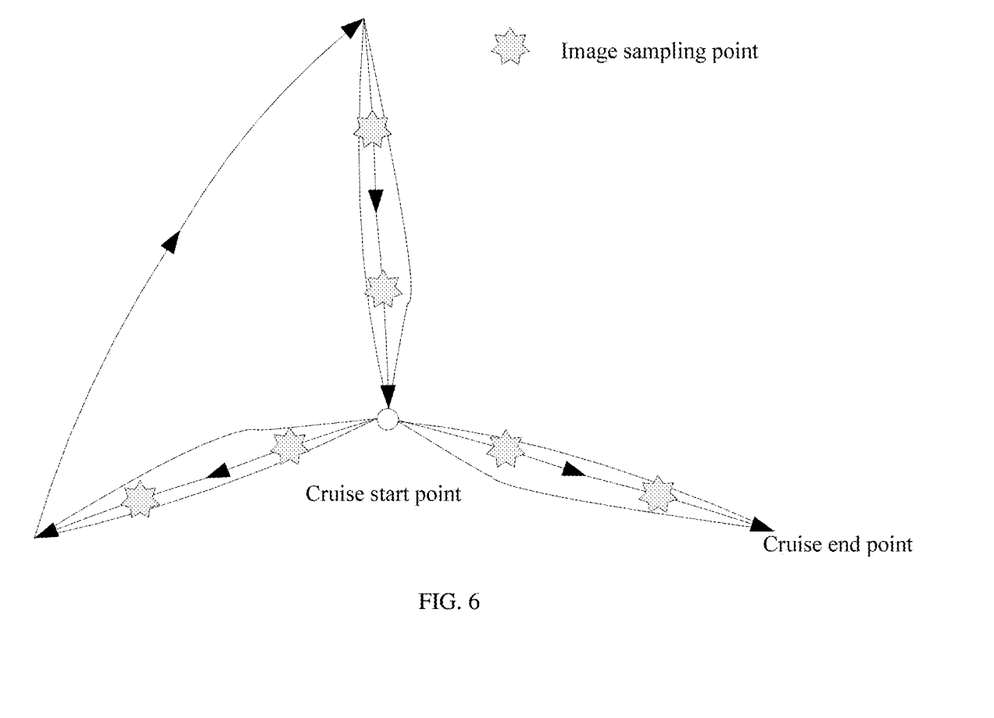
FIG. 6 is a schematic cruise diagram of a UAV when a WTB rotates slowly.

FIG. 5 and FIG. 6 are schematic diagrams of sampling points and a cruise path of the UAV when the WTB normally rotates slowly.

When the WTB rotates slowly as shown in FIG. 5, the four-rotor UAV performs image sampling as shown in FIG. 6. The UAV starts from an intersection point (a cruise start point) of the three WTBs, and cruises in a lengthwise direction of a first blade, where two image sampling points are disposed on the first blade. Then, the UAV cruises to a centrifugal end of a second blade (namely, an end of the second blade away from the intersection point of the three blades) and then in a lengthwise direction of the second blade from the centrifugal end of the second blade to the intersection point, where two image sampling points are also disposed in this process. Finally, the UAV cruises in a lengthwise direction of a third blade from the intersection point, to reach a centrifugal end of the third blade, where two image sampling points are also disposed in this process. Image collection for all blades is completed till now.

Compared with FIG. 3 and FIG. 4, when the WTB rotates, the UAV also needs to rotate with the WTBs. Therefore, the UAV can hardly circle around each WTB once, and a quantity of sampling points of the UAV is reduced to a half compared with a quantity of sampling points used when the wind turbine is shut down for maintenance. However, a distance between the UAV and the WTBs is the same as that in the operating condition in FIG. 3 and FIG. 4. Because a wind speed is slow when the WTB rotates slowly, working stability of the UAV is not affected.

Figure 7:
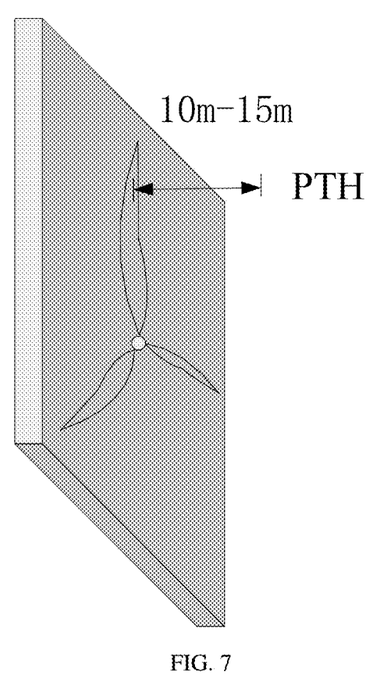
FIG. 7 is a schematic diagram of a second distance between a UAV and WTBs when a WTB rotates fast.
Figure 8:
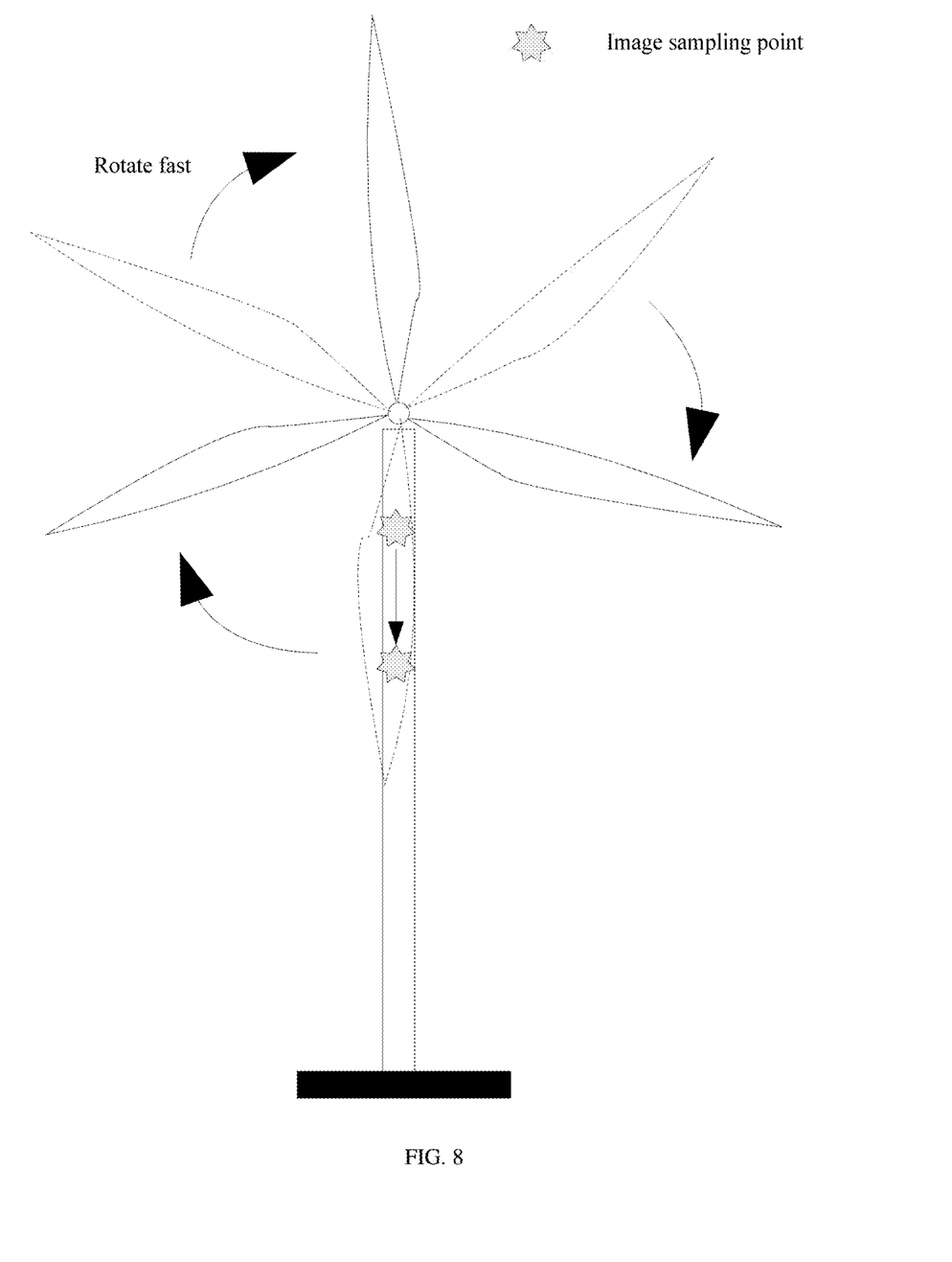
FIG. 8 is a schematic cruise diagram of a UAV when a WTB rotates fast.

FIG. 7 and FIG. 8 show a sampling method and a cruise path of the UAV when the WTBs rotate fast in a most windy period.

As shown in FIG. 7, when the WTBs rotate fast, a distance between the UAV and a rotation plane of the blades needs to be increased, to prevent a case in which a flow velocity of gas driven by rotation of the WTBs affects working stability of the four-rotor UAV. In an example, the distance is 10 meters to 15 meters.

In addition, because the WTBs rotate fast, and the UAV cannot rotate at the same rate as the blades, in the image sampling points and the cruise path shown in FIG. 8, the UAV reciprocates only between two sampling points in a lengthwise direction of a WTB. In an example of FIG. 8, the UAV reciprocates between two sampling points in a direction in which the intersection point of the WTBs is perpendicular to the ground, and separately samples the three WTBs that pass through the sampling points.

In the image sampling systems and methods of the UAV described above, the UAV can perform image sampling by using appropriate distances, cruise paths, and sampling points based on different operating conditions, to ensure completeness and accuracy of image sampling as far as possible, and further ensure device security and operation stability.

When the UAV collects images of the WTBs by using a camera on the PTH, the UAV transmits the images to a computer system. The computer system determines a blade damage on the image and outputs a final damage classification result.

The computer system classifies the images by using an improved VGG-19 net method, to determine a specific damage of a blade.

Same as a convolutional neural network, image preprocessing steps are simplified, features of the images are automatically extracted by using a convolution kernel, so that there is no need to manually set an extracted feature, and an impact caused by human and objective factors on the classification algorithm is excluded. The VGG-19 net is an existing classification algorithm, and is superior to a conventional convolutional neural network because a ReLU activation function sublayer and a Dropout function sublayer are introduced to the VGG-19 net. The ReLU activation function enables the VGG-19 net to have a bionic non-linear mapping function, simulate sparse connections of brain neurons, and complete non-linear mapping of an image feature. The Dropout sublayer randomly hides a weighted value and a link weight of neurons, enables the VGG-19 net to obtain a strong simultaneous adaptation capability and a strong generalization capability in a training process, and enables features of a convolutional layer and full connectivity of the VGG-19 net to be sparsely transferred and mapped in a testing process, to avoid occurrence of gradient scattering, gradient disappearance, and the like.

Figure 9A:
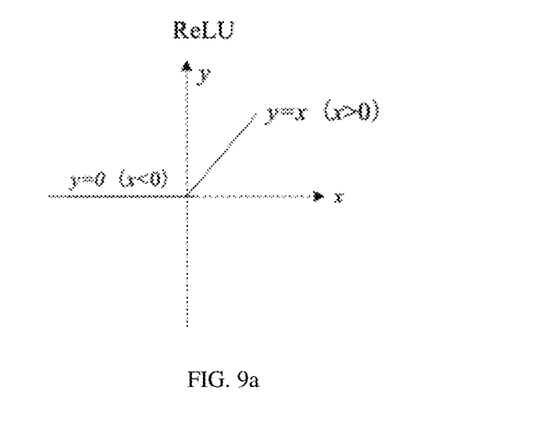
FIG. 9a and FIG. 9b are schematic diagrams respectively showing a LeakyReLU activation function and a ReLU activation function.
Figure 9B:
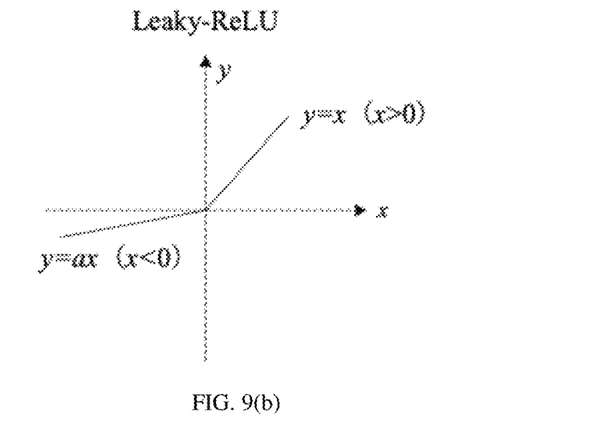

In this diagnosis system, the activation function is improved. Although the ReLU used as an activation function can enable network neurons to be sparsely activated, to relieve gradient scattering, gradient disappearance, and overfitting of network parameters, as the activation function, the ReLU causes some neurons to possibly be never activated, and a corresponding parameter can never be updated, namely, a dead ReLU problem. Therefore, to solve the problem, in this application, a LeakyReLU function sublayer is used to replace the original ReLU function sublayer of the VGG-19 net, and a difference between the LeadkyReLU and the ReLU is that for the LeakyReLU, an input value less than 0 is multiplied by a very small slope, and then be used as a weighted value of the neuron, to solve the dead ReLU problem. FIG. 9a and FIG. 9b are schematic diagrams respectively showing a LeakyReLU activation function model and a ReLU activation function model.

Figure 10:
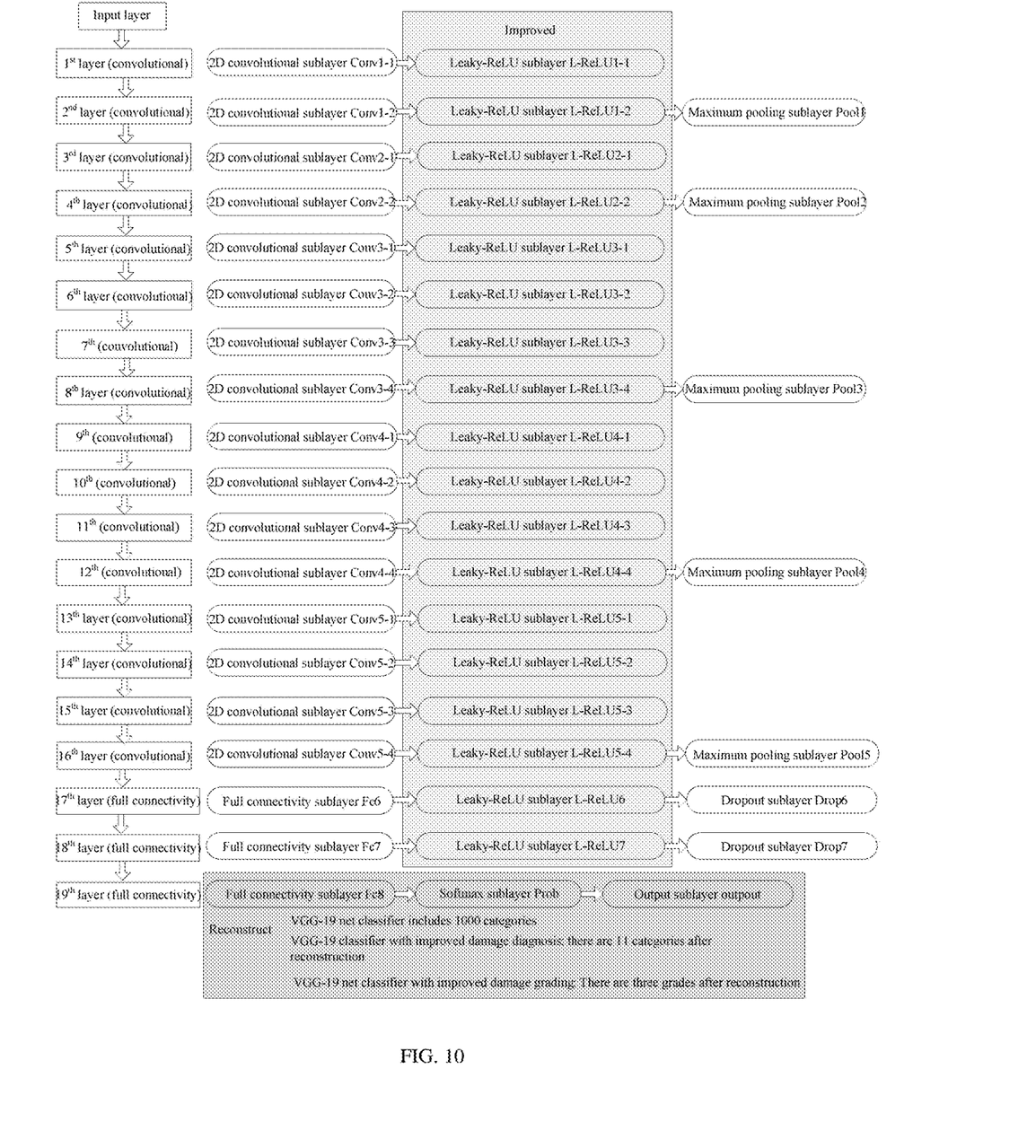
FIG. 10 is a schematic structural diagram of an improved and reconstructed VGG-19 net classification method.

In addition, in the diagnosis system, a classification layer of the VGG-19 net method is reconstructed. Because the classification layer of the VGG-19 net sets 1000 categories, to enable the VGG-19 net to better adapt to diagnosis of damages of surfaces of the WTBs, the classification layer needs to be reconstructed, and a quantity of categories of the classification layer is reset. Eleven damage diagnosis categories are set, namely, a background category, a zero damage category, a pseudo-damage category, a sand inclusion category, a crack category, a pitted surface category, a coating falling off category, a coating repair category, an edge corrosion category, a mixed damage category, and a surface water seepage category, and three damage grades are set, namely, a minor damage, an intermediate damage, and a severe damage. FIG. 10 is a schematic structural diagram of an improved and reconstructed VGG-19 net classification method.

Eleven damage diagnosis categories provided in the present invention are respectively the background category, the zero damage category, the pseudo-damage category, the sand inclusion category, the crack category, the pitted surface category, the coating falling off category, the coating repair category, the edge corrosion category, the mixed damage category, and the surface water seepage category. The background category includes a sky background and a grassland background. The zero damage category refers to an image of a blade having no damage. The pseudo-damage category includes a red arrow (identifying an operation direction of power generation), a drain hole, and a blue triangle (identifying an operation direction of power generation). The sand inclusion category means that there is only an ellipse damage (a sand inclusion or a sand pit). The crack category mainly means that there is only a long strip damage (a scratch or a crack). The pitted surface category refers to a damage caused by wide distribution of dense damages of the sand inclusion category. A damage of the coating falling off category refers to a case in which a coating on a surface of a blade on the image falls off. The coating repair category refers to a case in which there is a repair trace on the coating. A damage of the edge corrosion category refers to an image on which there is a corrosion and even cracking damage on an edge of a blade. The mixed damage category refers to a case in which damages on a blade on the image are of various shapes and types. A damage of the surface water seepage category refers to a case in which there is water inside the blade on the image.

There are three damage grades, namely, the minor damage, the intermediate damage, and the severe damage. The minor damage means that there is a single or small and shallow (surface) damage on a blade. The intermediate damage refers to widely distributed and shallow damages. The severe damage refers to dense, deep, and serious damages.

Training of the VGG-19 net classification method needs to be supported by an image library. A training image data set and a test image data set are extracted from the image library. A training method based on a cloud database is used in the present invention, to improve accuracy of the VGG-19 net classification method.

Figure 11:
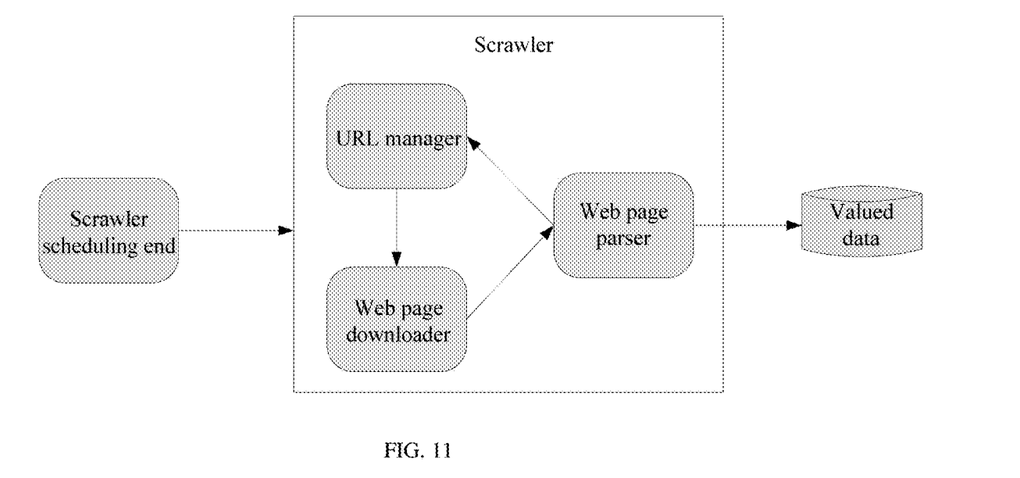
FIG. 11 is a schematic diagram of obtaining data by a network crawler.

As shown in FIG. 11, if the internet is compared to a large spider web, data is each node stored in the spider web, and a crawler is a small spider, and catches prey (data) along the web. The crawler is a program that initiates a request to a website, obtains a resource, and then analyzes the resource to extract desired data. Python is a programming language, has features of a simple and clear syntax and forcibly using a blank character for sentence indentation, and is applicable to multiple versions of software platforms, to implement a function of the crawler.

The cloud database setup method is:

setting up a Python crawler having an interaction function; and obtaining images of surfaces of the WTBs on a specified website or a whole network by using a Python crawler, and setting up the cloud database.

In this way, the VGG-19 net has a better generalization capability.

As described above, the improved VGG-19 net deep convolutional classification method is used in the present invention. An image is used as an input to perform training or testing. It is assumed that an input of a neural network is $X=\{x_1, x_2, x_3, \ldots x_i\}$, and an output is $Y(y_1, y_2, y_3, y_4, \ldots, y_m)$. There is a correspondence between the input X and the output Y. Training means that sufficient X and Y samples are input to a network, and a weighted value and a link weight of neurons of the neural network are adjusted by using the correspondence between the input and the output, to appropriately fit a non-linear mapping relationship between the input X and the output Y. Testing means that a fitting degree of the neural network for the problem is tested.

A back propagation (BP) neural network, the VGG-19 net, and the improved VGG-19 net method are compared. An experiment result indicates that a classification effect of the improved VGG-19 net in this application is optimal, for a damage diagnosis task, a diagnosis accuracy of the method may reach over 96%, and for a damage grading task, diagnosis accuracy may reach over 95%.

Figure 12:
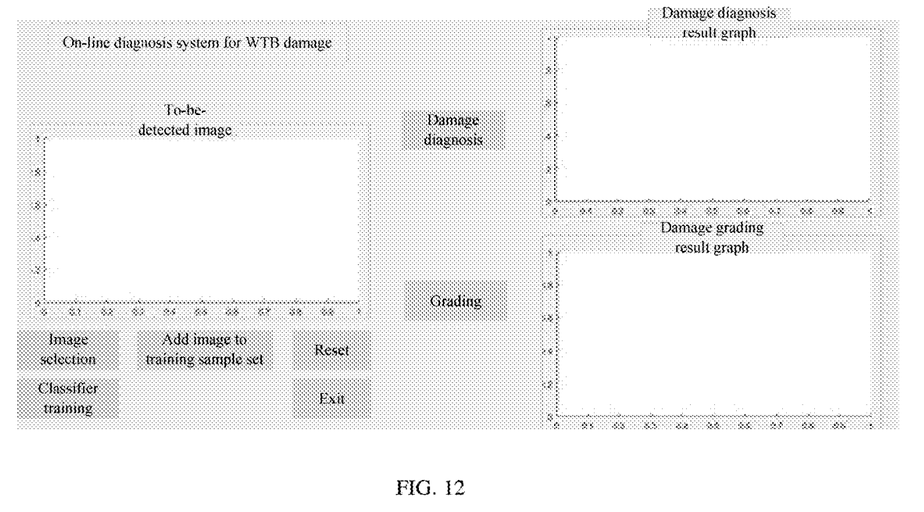
FIG. 12 is a schematic diagram of a graphical user interface (GUI) of a WTB damage diagnosis system in a computer system.

In addition, in the computer system described above, a human-computer interaction interface may be set up based on a GUI module in a matrix laboratory (MATLAB). The interface includes three coordinate image display units and seven buttons, namely, an image selection button, a damage diagnosis button, a grading button, a button for adding an image to a training sample set, a classifier training button, a reset button, and a button for exiting the system, as shown in FIG. 12.

Figure 13:
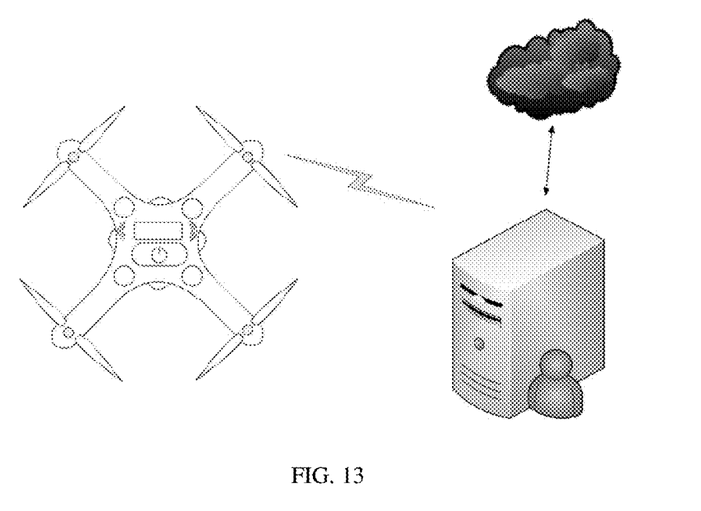
FIG. 13 is a schematic diagram of an entire connection of an on-line real-time diagnosis system for a WTB damage according to the present invention.
Figure 14:
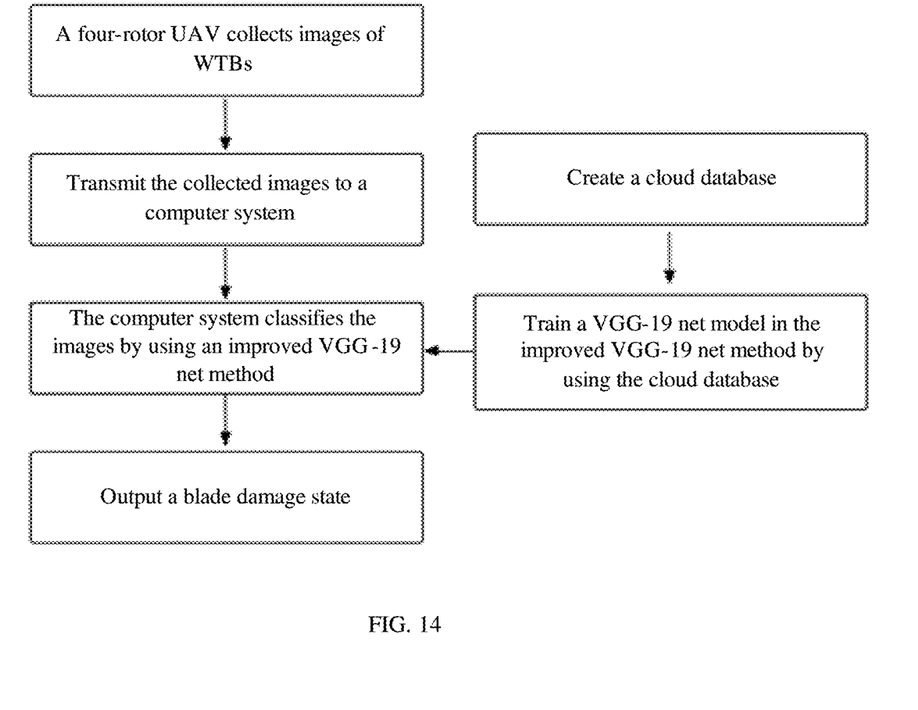
FIG. 14 is a schematic diagram of steps of an on-line real-time diagnosis method for WTB damage.

FIG. 13 is a schematic diagram of an entire structure of an on-line real-time diagnosis system for WTB damage. A cloud database is in communicative connection to a computer system, and a UAV is in communicative connection to the computer system. FIG. 14 is a schematic diagram of steps of an on-line real-time diagnosis method for WTB damage.

The present invention implements on-line diagnosis and detection on damages on surfaces of WTBs. Images of the damages on the surfaces of the WTBs are captured in a manner of preventive maintenance inspection by the UAV. The damages on the surfaces of the WTBs are diagnosed by using a VGG-19 net with an improved ReLU sublayer and a reconstructed classification layer. A deep convolutional neural network can implement automatic extraction of an image feature. A LeakyReLU activation function enables the VGG-19 net to have a bionic non-linear mapping function, simulate sparse connection of brain neurons, and complete non-linear mapping of image features. Latest images of the surfaces of the WTBs are obtained by using a Python scrawler, to update the database, so that a setup VGG-19 net classification model has a better generalization capability, and diagnosis accuracy can be ensured effectively. In an example, images that are of surfaces of WTBs in a wind power plant and that are captured through preventive maintenance inspection are updated to a specified website. The images on the website are obtained by using the interactive Python scrawler, to set up a WTB database of the wind power plant. The generalization capability and the diagnosis accuracy of the VGG-19 net model can be improved through training. A wind turbine diagnosis report of the plant can be obtained through diagnosis. Preventive maintenance inspection may be performed mainly on a location that is of a wind turbine of a particular model and at which a fault easily occurs. In addition, a manufacturer may be contacted to re-design a location that is of a WTB and at which a fault easily occurs, to remedy deficiency of blade manufacturing.

As can be learned, advantages of the present invention are as follows: Comprehensive and meticulous inspection is performed on the surfaces of the WTBs. The damages on the surfaces of the WTBs are diagnosed accurately, the damages are graded, and damage diagnosis accuracy and damage grading accuracy of the improved VGG-19 net model with the reconstructed classification layer may reach over 96%, so that non-professional working personnel on the site of wind power generation also can diagnose the damages on the surfaces of the WTBs. The database is updated, and the images of the surfaces of the WTBs on the specified website and even the whole network are collected by using the interactive Python scrawler, and are added to the database used to train the VGG-19 net, so that the training model has a better generalization capability. A good human-computer interaction interface is set up, so that an unskilled person can diagnose the damages on the surfaces of the WTBs.

The foregoing examples of the present invention are merely specific descriptions of the technical solutions of the present invention, and do not intend to limit the protection scope of this application. A person skilled in the art can make adaptive modification on the foregoing examples without departing from the concept of this application, and the modification also falls within the protection scope of this application.

What is claimed is:

1. An on-line real-time diagnosis system for wind turbine blade (WTB) damage, the on-line real-time diagnosis system comprising:
    a four-rotor unmanned aerial vehicle (UAV);
    a cloud database; and
    a computer system;
    wherein the four-rotor UAV captures images of WTBs in real time, and transmits the images to the computer system;
    wherein the cloud database stores an image library used for a Visual Geometry Group (VGG)-19 net image classification method, wherein an image in the image library stored in the cloud database is dynamically captured from a network; and
    wherein the computer system is used to perform training by using the image library to obtain an improved VGG-19 net image classification method, and classify, by using the improved VGG-19 net image classification method, the images of the WTBs received from the four-rotor UAV, to obtain a WTB damage diagnosis result and a damage grading result;
    wherein in the improved VGG-19 net image classification method, an original rectified linear unit (ReLU) function sublayer of a VGG-19 net is replaced with a leaky rectified linear unit (LeakyReLU) function sublayer to implement method improvement, and a structure of a classification layer is reconstructed; and
    wherein at the reconstructed classification layer, damage diagnosis categories comprise a background category, a zero damage category, a pseudo-damage category, a sand inclusion category, a crack category, a pitted surface category, a coating falling off category, a coating repair category, an edge corrosion category, a mixed damage category, and a surface water seepage category, and damage grades comprise a minor damage, an intermediate damage, and a severe damage.

2. The on-line real-time diagnosis system according to claim 1, wherein the four-rotor UAV comprises: one or more distance sensors disposed on a vehicle body and used to avoid surrounding obstacles; a radio signal transmitter used to communicate with the computer system, and a pan-and-tilt head (PTH) used to capture an image.

3. The on-line real-time diagnosis system according to claim 2, wherein the four-rotor UAV collects the images of the WTBs by using different cruise paths based on operating conditions of a wind turbine.

4. The on-line real-time diagnosis system according to claim 3, wherein:

when the wind turbine is shut down for maintenance in a least windy period, the four-rotor UAV is away from the WTBs by a first distance, and a preventive maintenance inspection route of the four-rotor UAV from a preventive maintenance inspection start point to a preventive maintenance inspection end point is circling around the three WTBs once;

when the WTB normally rotates slowly, the four-rotor UAV is away from the WTBs by a first distance, and the four-rotor UAV starts from an intersection point of the three WTBs, cruises in a lengthwise direction of a first blade, then cruises to a centrifugal end of a second blade and then in a lengthwise direction of the second blade from the centrifugal end of the second blade to the intersection point, and finally cruises in a lengthwise direction of a third blade from the intersection point, to reach a centrifugal end of the third blade; and when the WTB rotates fast in a most windy period, the four-rotor UAV is away from the WTBs by a second distance, and the four-rotor UAV reciprocates only between two sampling points on a WTB in a lengthwise direction, wherein the second distance is greater than the first distance, and a quantity of sampling points is set based on a distance between the four-rotor UAV and the WTBs, to ensure that complete images of the WTBs can be collected.

5. The on-line real-time diagnosis system according to claim 1, wherein the cloud database obtains images of surfaces of the WTBs on a specified website or a whole network by using a Python crawler and stores the images.

6. The on-line real-time diagnosis system according to claim 5, wherein the computer system uploads the images of the WTBs regularly captured by the four-rotor UAV to the specified website, so that the Python crawler obtains the images and updates the cloud database.

7. A on-line real-time diagnosis method for wind turbine blade (WTB) damage, the on-line real-time diagnosis method comprising:
    collecting, by a four-rotor unmanned aerial vehicle (UAV), images of WTBs, and transmitting the collected images to a computer system;
    training a Visual Geometry Group (VGG)-19 net model in an improved VGG-19 net image classification method by using a dynamically updated training and testing image library provided by a cloud database;
    receiving, by the computer system, the collected images, and classifying the images by using the VGG-19 net image classification method; and
    outputting, by the computer system, a blade damage state based on an image classification result;
    wherein in the improved VGG-19 net image classification method, an original rectified linear unit (ReLU) function sublayer of a VGG-19 net is replaced with a leaky rectified linear unit (LeakyReLU) function sublayer to implement method improvement, and a structure of a classification layer is reconstructed; and
    wherein at the reconstructed classification layer, damage diagnosis categories comprise a background category, a zero damage category, a pseudo-damage category, a sand inclusion category, a crack category, a pitted surface category, a coating falling off category, a coating repair category, an edge corrosion category, a mixed damage category, and a surface water seepage category, and damage grades comprise a minor damage, an intermediate damage, and a severe damage.

8. The on-line real-time diagnosis method according to claim 7, wherein the four-rotor UAV collects the images of the WTBs by using different cruise paths based on operating conditions of a wind turbine.

9. The on-line real-time diagnosis method according to claim 8, wherein:

when the wind turbine is shut down for maintenance in a least windy period, the UAV is away from the WTBs by a first distance, and a preventive maintenance inspection route of the UAV from a preventive maintenance inspection start point to a preventive maintenance inspection end point is circling around the three WTBs once;

when the WTB normally rotates slowly, the UAV is away from the WTBs by a first distance, and the UAV starts from an intersection point of the three WTBs, cruises in a lengthwise direction of a first blade, then cruises to a centrifugal end of a second blade and then in a lengthwise direction of the second blade from the centrifugal end of the second blade to the intersection point, and finally cruises in a lengthwise direction of a third blade from the intersection point, to reach a centrifugal end of the third blade; and when the WTB rotates fast in a most windy period, the UAV is away from the WTBs by a second distance, and the UAV reciprocates only between two sampling points on a WTB in a lengthwise direction, wherein the second distance is greater than the first distance, and a quantity of sampling points is set based on a distance between the UAV and the WTBs, to ensure that complete images of the WTBs can be collected.

10. The on-line real-time diagnosis method according to claim 7, wherein images of surfaces of the WTBs on a specified website or a whole network are obtained by using a Python crawler, and the cloud database is created.

11. The on-line real-time diagnosis method according to claim 10, wherein the computer system uploads the images of the WTBs regularly captured by the four-rotor UAV to the specified website, so that the Python crawler obtains the images and updates the cloud database.

* * * * *

UNITED STATES PATENT AND TRADEMARK OFFICE
CERTIFICATE OF CORRECTION

PATENT NO. : 11,514,567 B2  
APPLICATION NO. : 16/903037  
DATED : November 29, 2022  
INVENTOR(S) : Chaoyi Dong, Xiaoyi Zhao and Xiaoyan Chen Page 1 of 1

It is certified that error appears in the above-identified patent and that said Letters Patent is hereby corrected as shown below:

On the Title Page

Item (73) Inner Mongolia University of Technology, Hohhot, NM (US)  
Should be: Inner Mongolia University of Technology, Hohhot (CN)

Signed and Sealed this  
Twenty-fifth Day of November, 2025

John A. Squires  
*Director of the United States Patent and Trademark Office*